Jan. 3, 1956 J. B. VICTOR 2,729,483
GASKET
Filed Oct. 31, 1951
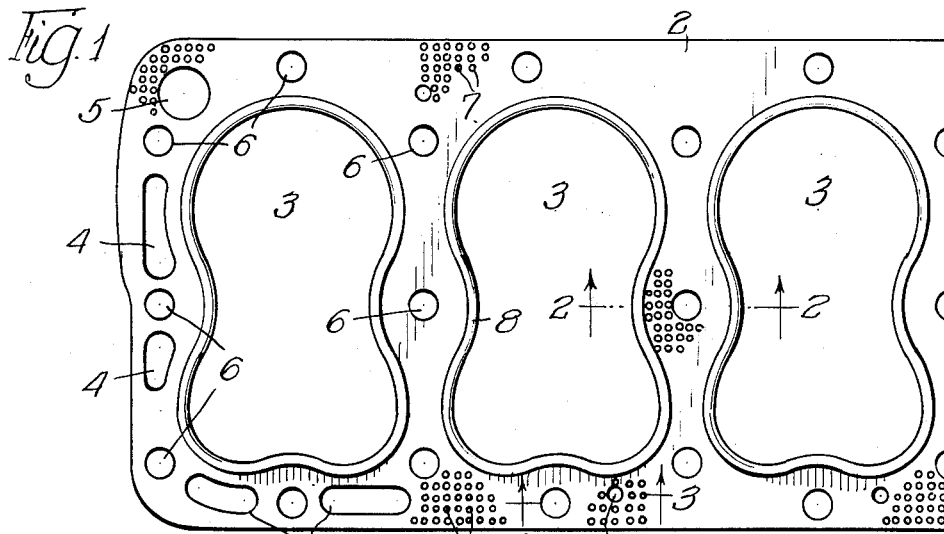
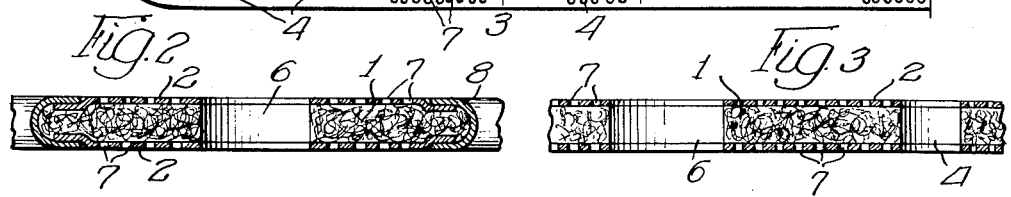
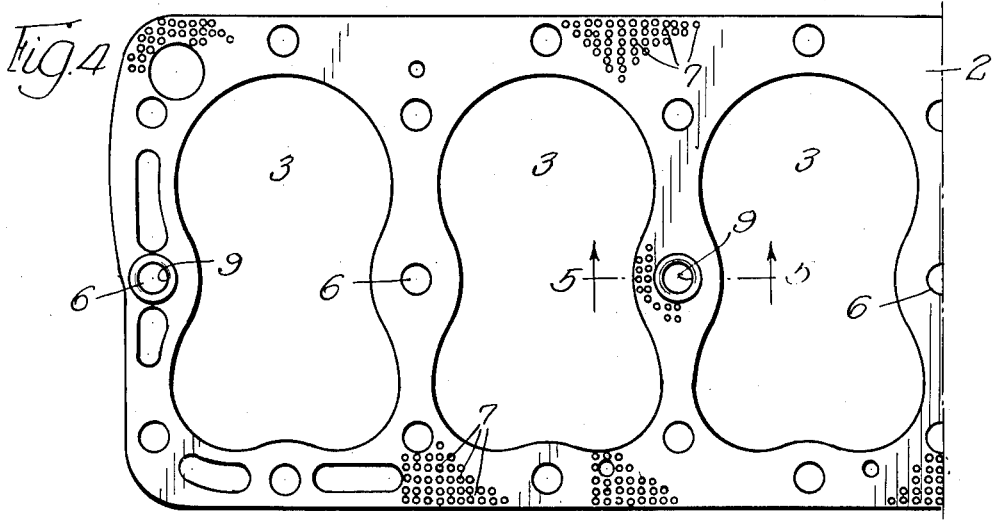
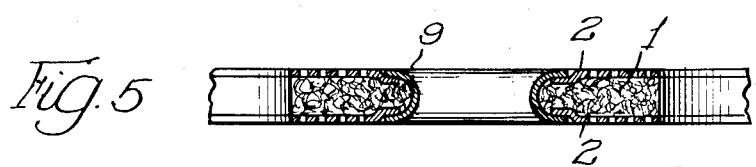
INVENTOR.
Joseph B Victor,
BY George J Haight &
George H Simmons Atty

United States Patent Office 2,729,483
Patented Jan. 3, 1956

2,729,483

GASKET

Joseph B. Victor, Chicago, Ill., assignor to Victor Manufacturing & Gasket Co., Chicago, Ill., a corporation of Illinois Application October 31, 1951, Serial No. 254,152

2 Claims. (Cl. 288—26)

This invention relates to gaskets, more particularly it relates to metal faced asbestos gaskets, and has for its principal object a new and improved gasket of this type.

It is a main object of the invention to provide a metal faced asbestos gasket that is highly flexible and highly compressible and capable of tightly sealing two abutting surfaces against high pressures at high temperatures, even though those surfaces contain irregularities and are not truly planar.

Another object of the invention is to provide a highly flexible metal faced gasket that is unitary and capable of being handled without damage.

Another object of the invention is to provide a metal faced asbestos cylinder head gasket that is highly flexible and highly compressible and is impervious to oils, gas, coolants and heat, and is capable of forming and maintaining a tight seal between the block and head of an internal combustion engine.

Another object of the invention is to provide a metal faced asbestos cylinder head gasket possessing good thermal characteristics so that heat transfer from a block to the head of an internal combustion engine will not be interfered with by the gaskets.

Another object of the invention is to provide a metal faced asbestos gasket that can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which:

Fig. 1 is a fragmentary plan view of a cylinder head gasket showing the invention;

Fig. 2 is a cross sectional view taken along the line 2—2 of Fig. 1, looking in the direction of the arrows and drawn to an enlarged scale;

Fig. 3 is a cross sectional view along the line 3—3 of Fig. 1, looking in the direction of the arrows and also drawn to an enlarged scale;

Fig. 4 is a plan view of a modified form of cylinder head gasket showing the invention; and Fig. 5 is a fragmentary cross sectional view along the line 5—5 of Fig. 4, looking in the direction of the arrows and drawn to an enlarged scale.

Metal faced asbestos gaskets are commonly employed to seal two abutting machine parts so as to provide a tight joint therebetween, particularly when those parts are subjected to high pressures and temperatures. Thus, for example, cylinder head gaskets in an internal combustion engine interposed between the block and head frequently consist of a sheet of heatproof material, such as asbestos, sandwiched between thin metal facings usually composed of steel or copper. The present invention relates to gaskets of this type, and in the embodiment shown by way of example a cylinder head gasket is illustrated.

Although the sealing surfaces of the head and block are supposed to be planar and smooth, and when the head is drawn tightly down onto the block are supposed to be truly parallel, it frequently happens that these surfaces are not truly planar, nor are they brought to truly parallel position.

In the prior art of which I am aware, in most instances metal faced gaskets of this type have been provided with numerous grommets or flangelike portions which hold the members together and which also stiffen the gasket so that it becomes difficult to form and maintain a pressure fluid-tight joint in cases where the block or head contains small imperfections. Furthermore, cylinder heads frequently warp slightly so that the surfaces of the head and block can never be brought into true parallelism.

Also in the prior art of which I am aware are gaskets of this type in which the metal facings are cut away exposing large areas of the compressible material, such as asbestos, into direct contact with the block and head. Although such material is treated to prevent its sticking or adhering to the block or head, nevertheless it may stick to these members; and when a large area of compressible material is exposed to the metal parts and sticks thereto, removal of the gasket results in tearing out of large areas of the compressible material which must be removed from the block or head before a new gasket can be placed.

The present invention provides a metal faced gasket consisting of a central sheet of compressible material, preferably an asbestos which has been treated in the making of the sheet with resinous organic binders which render it impervious to oils, water, gas and coolants, without impairing its flexibility. The sheet of material is cut to fit accurately with the engine block and contains openings registered with the cylinder, coolant passages, oil passages and bolt holes. Registered with and engaging the opposite faces of this compressible sheet are thin metallic facing members, preferably copper or steel, having the same shape as the sheet of asbestos.

In addition to the service openings, these metal facings also contain a plurality of small perforations spaced close together and extending over the entire area of the facing.

These numerous small perforations have been found to add flexibility to the gasket, better enabling it to accurately conform to and form a tight seal between the machine parts even when those parts contain imperfections and irregularities. As the head is being tightened onto the block and the gasket compressed, the asbestos may be forced into and through the perforations in the facings thereby to come into direct contact with the engine parts. Should the asbestos thus engaging the engine parts stick thereto, the points of sticking will be separated and the gasket can be peeled off of the engine part without difficulty. No large sections of asbestos being in contact with the metal, the sheet will not be torn, and cleaning of the machine parts preparatory to the insertion of a new gasket is therefore held to a minimum.

In order that the sheet of compressible material and two facing members forming the gaskets can be handled as a unit, it is necessary that they be securely fastened together. In the preferred form of the present invention, the parts of the gasket are secured together either by grommets spaced in certain ones of the centermost bolt holes in the gasket or by cylinder opening flanges. In either event, the securing means are relatively few in number and are so located as not to impair the compressibility of the gasket.

Referring now to the drawings in more detail, it will be seen that the cylinder head gasket shown by way of example consists of a central sheet of compressible material 1, preferably asbestos treated with a resinous organic binder that renders it impervious to oil, gas and coolants, without impairing the ability of the asbestos to withstand heat. Located on the upper and lower faces of the central sheet 1 are facing members 2 which are thin sheets of metal, either copper or steel.

As will be seen in Fig. 1, the gasket contains combustion openings 3, coolant openings 4, the particular size and shape of which forms no part of the present invention and will be varied to adapt the gaskets to various engine specifications. The gasket also contains an oil hole 5 and bolt holes 6 which likewise will be varied.

The metal facings 2 contain a plurality of small perforations 7 located in uniformly spaced rows, with the perforations uniformly spaced in the row. In one embodiment of the invention the perforations 7 are $\tfrac{1}{16}$ of an inch in diameter and are spaced ten to the inch in the row and the rows spaced likewise ten to the inch. In this embodiment it will be seen that $\tfrac{10}{16}$ of the length of the row will be accompanied by perforations and $\tfrac{6}{16}$ by the metal remaining between adjacent ones of the perforations. With an arrangement of this kind, slightly over 30% of each square inch of the metal facing is occupied by perforations.

In the embodiment of the invention shown in Fig. 1, the compressible sheet 1 and facings 2 are held together by the flanges 8 which surround the combustion openings 3. These flanges, which may likewise be formed of steel or copper, are preferable when the gasket is to be used in high compression ratio engines such as are frequently encountered.

In the embodiment of the invention shown in Fig. 4, the compressible material 1 and facings 2 are held together by grommets 9 located in alternate ones of the bolt holes 6 disposed on the longitudinal median line of the gasket. The combustion openings 3 are not faced, this type of gasket being satisfactory for use in internal combustion engines having relatively low compression ratios. In both embodiments the fastening means are located in regions where the bolt pressure is highest, and consequently there is no interference to the forming of a tight seal between the engine and the block.

With the central compressible sheet 1 composed of resin treated asbestos that is impervious to oils, gas and coolants and capable of withstanding high heat, the gasket of the present invention is capable of forming and maintaining a tight seal between the block and head, even though one or both of the gasket engaging surfaces contains irregularities rendering it non-planar. As the gasket is compressed between these parts, the compressible material may flow through the perforations into direct engagement with the head or block. Because of the flexibility added to the thin sheet metal facings by the perforations therein, the gasket can readily conform to irregularities in the surfaces and form a tight seal therewith. Should the asbestos which has flowed through the perforations stick to the block or head, the separation of the points of sticking produced by the thin wall of metal intervening between adjacent perforations permits peeling the gasket off of the head or block notwithstanding the sticking of the asbestos thereto. Cleaning of the surfaces preparatory to the insertion of a new gasket is therefore minimized.

While I have chosen to illustrate my invention by showing and describing it as applied to a cylinder head gasket composed of asbestos and sheet metal facings, I have done so by way of example, as the gasket may be put to other uses and the compressible material may be material other than asbestos.

Having thus complied with the statutes, and shown and described the preferred embodiment of my invention, what I consider new and desire to have protected by Letters Patent is pointed out in the appended claims.

What is claimed is:

1. A cylinder head gasket for internal combustion engines comprising: a sheet of compressible asbestos shaped to conform to the cylinder head and containing a plurality of groups of openings conforming to corresponding openings in the cylinder block and head; a pair of thin flexible planar metallic facing members registered with and conforming to said sheet and containing openings registering with the openings in said sheet and in addition containing a plurality of relatively small perforations, from which the metal is completely removed to leave the members planar on both faces thereby to increase the flexibility of the members, through which perforations the asbestos may flow into direct contact with the cylinder block and head as the gasket is compressed therebetween; and means securing together said sheet and facings so that the gasket may be handled as a unit prior to assembly in the engine.

2. A gasket as claimed in claim 1, in which the securing means are grommets fixed in certain ones of the bolt holes in the gasket.

References Cited in the file of this patent

UNITED STATES PATENTS

| | | |
|---|---|---|
| 1,035,190 | Hill | Aug. 13, 1912 |
| 1,653,439 | Payne | Dec. 20, 1927 |
| 1,692,857 | Oven | Nov. 27, 1928 |
| 1,772,173 | Yates | Aug. 5, 1930 |
| 2,001,225 | Victor | May 14, 1935 |
| 2,029,302 | Balfe | Feb. 4, 1936 |
| 2,170,363 | Balfe | Aug. 22, 1939 |